(12) United States Patent
Aller

(10) Patent No.: US 12,233,764 B2
(45) Date of Patent: Feb. 25, 2025

(54) VEHICLE INCLUDING A MAGNETIC LEVITATION (MAGLEV) SEAT SYSTEM

(71) Applicant: GM Global Technology Operations LLC, Detroit, MI (US)

(72) Inventor: David M. Aller, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 302 days.

(21) Appl. No.: 17/974,754

(22) Filed: Oct. 27, 2022

(65) Prior Publication Data

US 2024/0140283 A1    May 2, 2024

(51) Int. Cl.
*B60N 2/50* (2006.01)
*B60N 2/06* (2006.01)

(52) U.S. Cl.
CPC ........... *B60N 2/501* (2013.01); *B60N 2/06* (2013.01); *B60N 2/509* (2013.01)

(58) Field of Classification Search
CPC ........ B60N 2/0272; B60N 2/501; B60N 2/06; B60N 2/509; B60N 2/0881
See application file for complete search history.

(56) References Cited

U.S. PATENT DOCUMENTS

| | | | | |
|---|---|---|---|---|
| 5,146,853 | A * | 9/1992 | Suppes | B60L 15/005 104/282 |
| 5,967,549 | A * | 10/1999 | Allen | B60R 21/01554 280/735 |
| 7,224,252 | B2 * | 5/2007 | Meadow, Jr. | A63B 21/00192 310/12.24 |
| 11,958,390 | B2 * | 4/2024 | Chen | B60N 2/06 |
| 2020/0217637 | A1 * | 7/2020 | Del Vecchio | B60N 2/0272 |
| 2024/0043229 | A1 * | 2/2024 | Baker | A63B 22/02 |
| 2024/0375602 | A1 | 11/2024 | Aller | |

FOREIGN PATENT DOCUMENTS

WO    WO-2024156413 A1 *   8/2024    ........... B60N 2/0224

OTHER PUBLICATIONS

US Notice of Publication for U.S. Appl. No. 18/315,772; dated Nov. 14, 2024.

* cited by examiner

*Primary Examiner* — Milton Nelson, Jr.
(74) *Attorney, Agent, or Firm* — CANTOR COLBURN LLP

(57) ABSTRACT

A vehicle seat system includes a support surface having a first side and a second side that is opposite the first side. A first seat rail is coupled to the first side of the support surface. A second seat rail is coupled to the first side of the support surface spaced from the first seat rail. A seat member includes a first stanchion moveably supported at the first seat rail, a second stanchion moveably supported at the second seat rail, and a member arranged between the first stanchion and the second stanchion. A magnet is mounted at the second side of the support surface. A levitation controller is operatively connected to the magnet. The levitation controller is activated to drive the magnet to repel the member and raise the first stanchion and the second stanchion relative to corresponding ones of the first seat rail and the second seat rail.

20 Claims, 4 Drawing Sheets

VEHICLE INCLUDING A MAGNETIC LEVITATION (MAGLEV) SEAT SYSTEM

INTRODUCTION

The subject disclosure relates to the art of vehicles and, more particularly, to a vehicle having a magnetic levitation (MAGLEV) seat system.

Vehicles include a number of seats that accommodate passengers that may include a driver. In many cases, the seats are arranged in a front row and a second row behind the front row. In some cases a third row is disposed behind the second row. In most cases, front seats are fore-to-aft adjustable in order to accommodate different sized passengers. That is, the front seats are attached to, and may move relative to, first and second support rails. The seats may include a manual adjustment mechanism or a powered adjustment mechanism.

With a manual adjustment mechanism, the user manipulates a toggle to release a seat track from the support rail to enable movement and repositioning of the seat. With a powered adjustment mechanism, the user may adjust the seats with a push of a button. That is, the user activates a motor to move the seat. The motor moves the seats by shifting seat tracks on the support rails until the button is released.

Seat tracks and support rails can be difficult to move at times. Seat tracks can get stuck, manual releases may, over time, wear, or other issues may arise that create impediments to seat adjustability. In addition the seat tracks, guide rails, and release mechanism create a hardware intensive system that increases cost and complexity of the vehicle. Accordingly, it is desirable to provide a system that reduces manufacturing, inventory, and maintenance costs as well as enhances a user experience with the vehicle.

SUMMARY

A vehicle seat system, in accordance with a non-limiting example, includes a support surface having a first side and a second side that is opposite the first side. A first seat rail is coupled to the first side of the support surface. A second seat rail is coupled to the first side of the support surface spaced from the first seat rail. A seat member includes a first stanchion moveably supported at the first seat rail, a second stanchion moveably supported at the second seat rail, and a member arranged between the first stanchion and the second stanchion. The member is formed from a magnetic material. A magnet is mounted at the second side of the support surface. A levitation controller is operatively connected to the magnet. The levitation controller is selectively activated to drive the magnet to repel the member and raise the first stanchion and the second stanchion relative to corresponding ones of the first seat rail and the second seat rail.

In addition to one or more of the features described herein the magnet includes a plurality of magnets arrayed about the second side of the support surface.

In addition to one or more of the features described herein the levitation controller selectively controls one or more of the plurality of magnets to repel the member and raise the first stanchion and the second stanchion relative to the first seat rail and the second seat rail respectively.

In addition to one or more of the features described herein the levitation controller selectively controls one or more of the plurality of magnets to shift the seat member relative to the first seat rail and the second seat rail.

In addition to one or more of the features described herein the levitation controller selectively controls one or more of the plurality of magnets to establish one of a plurality of pre-determined seat positions for the seat member.

In addition to one or more of the features described herein the support surface includes a plurality of locking elements.

In addition to one or more of the features described herein another member arranged between the first stanchion and the second stanchion, the another member supporting a locking member configured to engage one of the plurality of locking elements to secure the seat member in the one of the plurality of pre-determined seat positions.

In addition to one or more of the features described herein the locking member comprises a selectively extendable pin and the plurality of locking elements comprise a plurality of openings formed in the support surface, the selectively extendable pin passing into the one of the plurality of openings to secure the seat member in the one of the plurality of pre-determined seat positions.

In addition to one or more of the features described herein the selectively extendable pin includes a selectively deployable locking portion that selectively prevents withdrawal of the selectively extendable pin from the one of the plurality of openings.

In addition to one or more of the features described herein a cam mechanism that selectively shifts the selectively extendable pin into the one of the plurality of openings.

A vehicle, in accordance with a non-limiting example, includes a body defining a passenger compartment and a vehicle seat system arranged in the passenger compartment. The vehicle seat system includes a support surface having a first side and a second side that is opposite the first side, a first seat rail coupled to the first side of the support surface and a second seat rail coupled to the first side of the support surface spaced from the first seat rail. A seat member includes a first stanchion moveably supported at the first seat rail, a second stanchion moveably supported at the second seat rail, and a member arranged between the first stanchion and the second stanchion. The cross-member is formed from a magnetic material. A magnet is mounted at the second side of the support surface and a levitation controller is operatively connected to the magnet. The levitation controller is selectively activated to drive the magnet to repel the member and raise the first stanchion and the second stanchion relative to corresponding ones of the first seat rail and the second seat rail.

In addition to one or more of the features described herein the magnet includes a plurality of magnets arrayed about the second side of the support surface.

In addition to one or more of the features described herein the levitation controller selectively controls one or more of the plurality of magnets to repel the member and raise the first stanchion and the second stanchion relative to the first seat rail and the second seat rail respectively.

In addition to one or more of the features described herein the levitation controller selectively controls one or more of the plurality of magnets to shift the seat member relative to the first seat rail and the second seat rail.

In addition to one or more of the features described herein the levitation controller selectively controls one or more of the plurality of magnets to establish one of a plurality of pre-determined seat positions for the seat member.

In addition to one or more of the features described herein the support surface includes a plurality of locking elements.

In addition to one or more of the features described herein another member arranged between the first stanchion and the second stanchion, the another member supporting a locking member configured to engage one of the plurality of locking elements to secure the seat member in the one of the plurality of pre-determined seat positions.

In addition to one or more of the features described herein the locking member comprises a selectively extendable pin and the plurality of locking elements comprise a plurality of openings formed in the support surface, the selectively extendable pin passing into the one of the plurality of openings to secure the seat member in the one of the plurality of pre-determined seat positions.

In addition to one or more of the features described herein the selectively extendable pin includes a selectively deployable locking portion that selectively prevents withdrawal of the selectively extendable pin from the one of the plurality of openings.

In addition to one or more of the features described herein a cam mechanism that selectively shifts the selectively extendable pin into the one of the plurality of openings.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
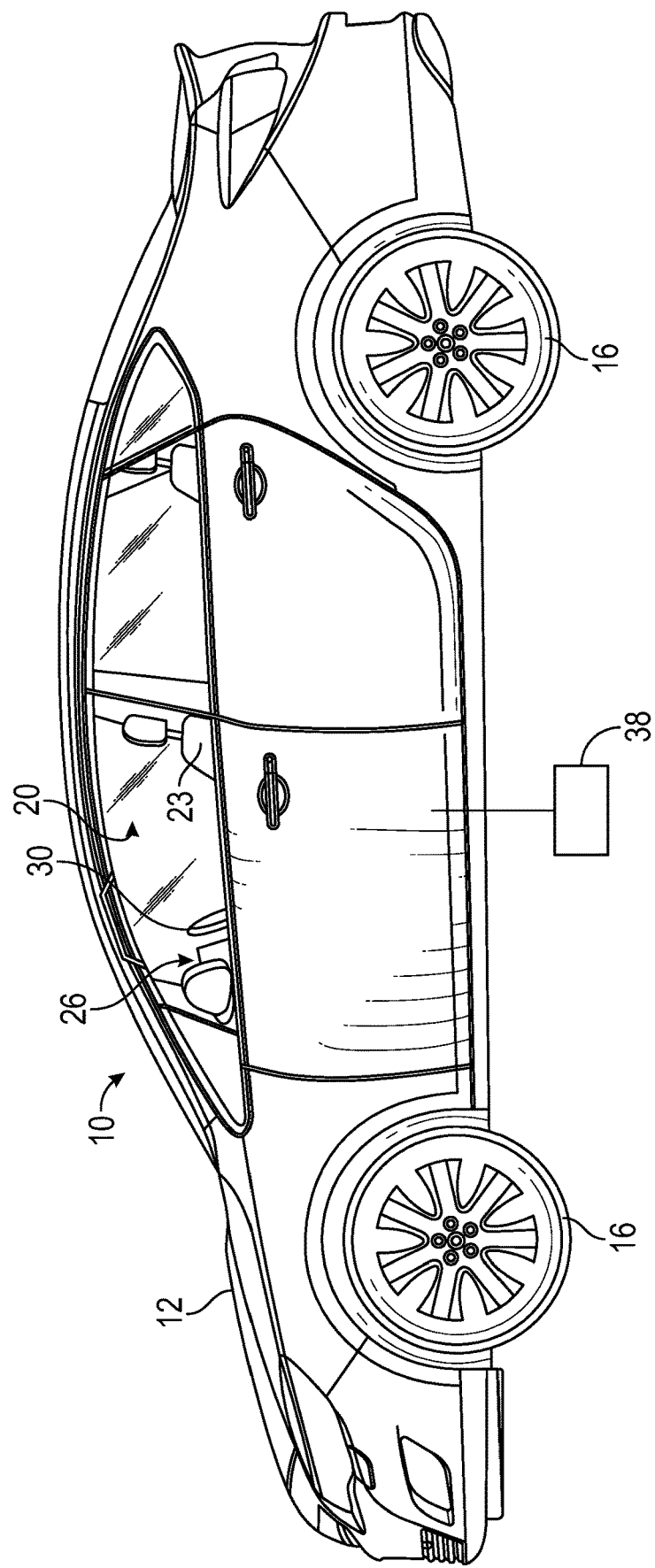
FIG. 1 is a left side plan view of a vehicle including a magnetic levitation (MAGLEV) seat system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. Body 12 defines, in part, a passenger compartment 20 having a seat system 23 positioned behind a dashboard 26. A steering control 30 is arranged between seat system 23 and dashboard 26. Steering control 30 is operated to control the orientation of the steerable wheels. Vehicle 10 includes a motor (not shown) operatively connected to a transmission (also not shown) that drives one or more of the plurality of wheels 16. The motor may take the form of an internal combustion engine, an electric motor, or a hybrid power source.

Figure 2:
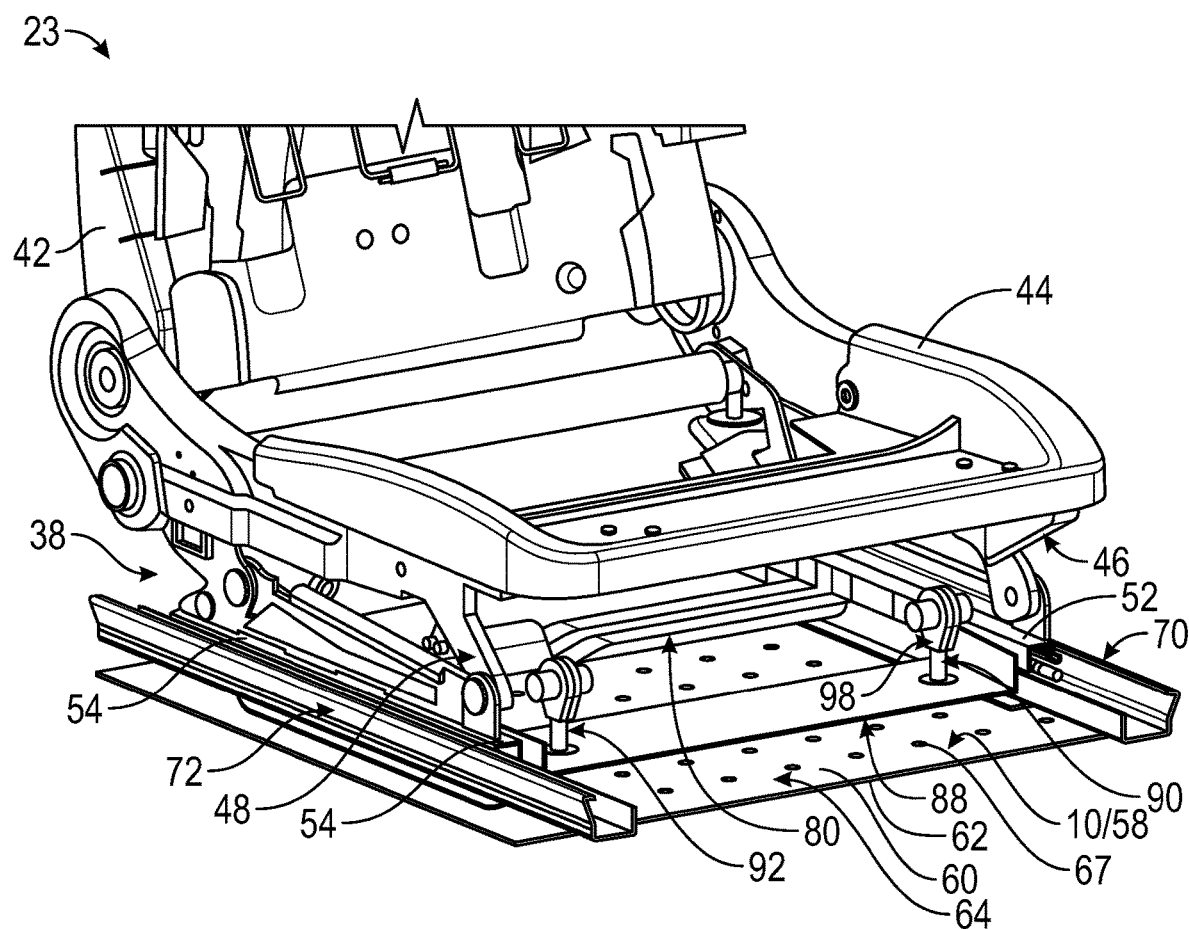
FIG. 2 is a partial perspective view of the MAGLEV seat system arranged on a support surface of the vehicle, in accordance with a non-limiting example.

In accordance with a non-limiting example, seat system 23 includes a magnetic levitation (MAGLEV) system 38. MAGLEV system 38 promotes fore-to-aft movement of vehicle seat system 23 as will be detailed herein. Seat system 23 is shown in FIG. 2 without upholstery. Seat system 23 includes a seat back member 42 pivotally connected to a seat base member 44. Seat base member 44 includes a first stanchion 46 and a second stanchion 48. Second stanchion 48 is spaced from first stanchion 46. As will be detailed herein, first stanchion 46 and second stanchion 48 provide support for seat system 23. In a non-limiting example, first stanchion 46 supports a first glide 52 and second stanchion 48 supports a second glide 54. First and second glides 52 and 54 establish a sliding interface between seat base member 44 and vehicle 10.

Figure 3:
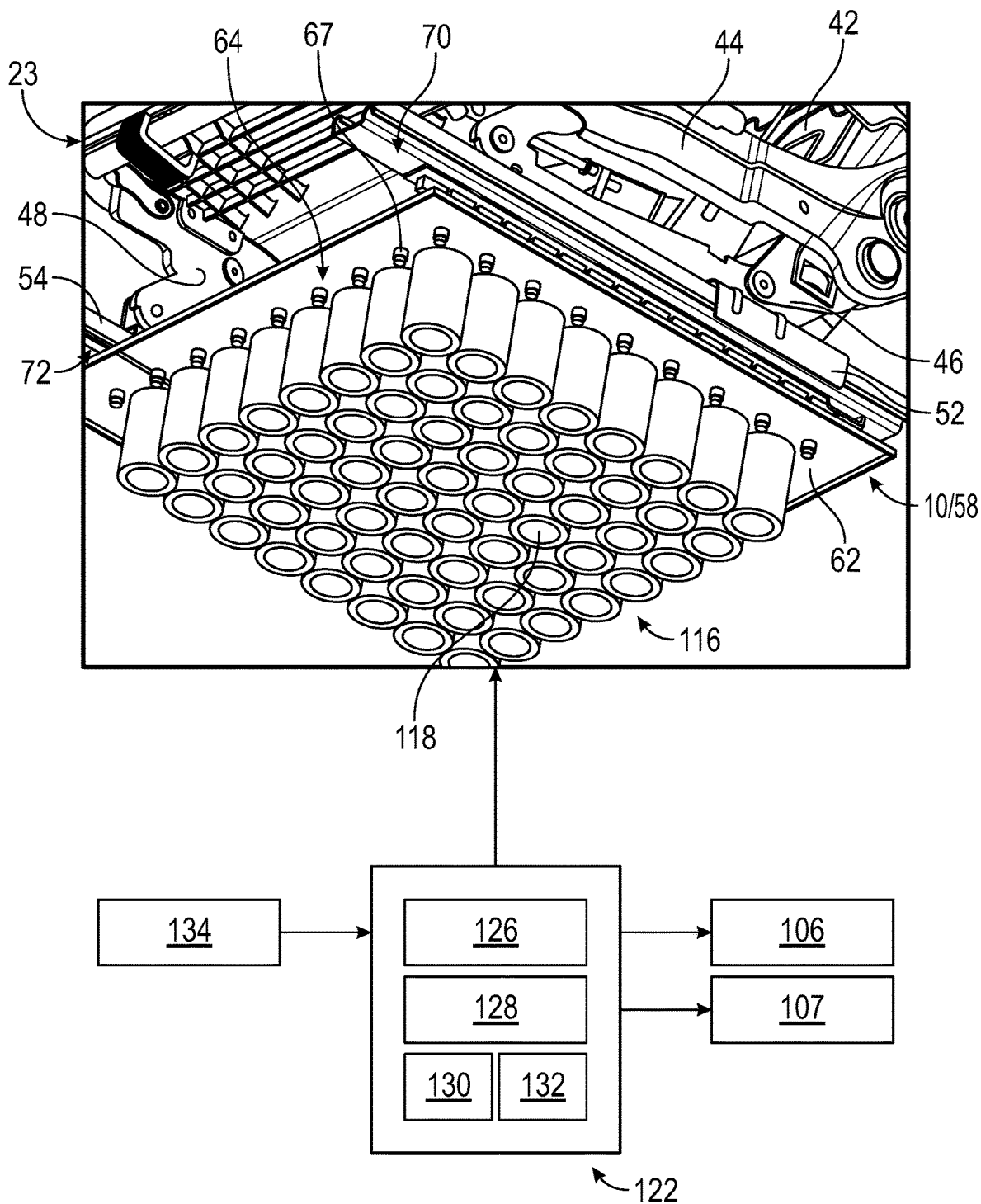
FIG. 3 is a perspective view of a plurality of magnets mounted to an underside of the support surface of FIG. 2, in accordance with a non-limiting example.

In accordance with a non-limiting example, vehicle 10, includes a floor or support surface 58 having a first side 60 and a second side 62 (FIG. 3). Second side 62 is opposite to first side 60. Support surface 58 includes a plurality of locking elements 64 that establish a number of pre-set, or pre-determined seating positions for seat base member 44. In the non-limiting example shown, locking elements 64 are shown in the form of circular openings 67. It should however be understood that locking elements 34 may take on a variety of forms including structure mounted to first side 60 of support surface 58. A first seat rail 70 and a second seat rail 72 are spaced one from another and mounted to first side 60. First glide 52 interacts with and slides relative to first seat rail 70 and second glide 54 interacts with and slide relative to second seat rail 72.

In a non-limiting example, seat base member 44 includes a first cross-member 80 that extends between and connects with first stanchion 46 and second stanchion 48. First cross-member 80 is formed from a ferro-magnetic material. In a non-limiting example, the ferro-magnetic material may take the form of iron, cobalt, nickel, and/or alloys thereof. At this point it should be understood that while shown and described as extending between and connecting with the first and second stanchions 46 and 48, cross-member 80 may take on a variety of forms including those arrangement that do not connect with the first and second stanchions 46 and 48.

Seat base member 44 also includes a second cross-member 88 that is spaced forward of first cross-member 80. Second cross-member 88 extends between and connects with first stanchion 46 and second stanchion 48. Second cross-member 88 supports a first locking member 90 and a second locking member 92. First and second locking members 90 and 92 interact with select ones of the plurality of locking elements 64 to establish a pre-set position for seat base member 44.

Figure 4:
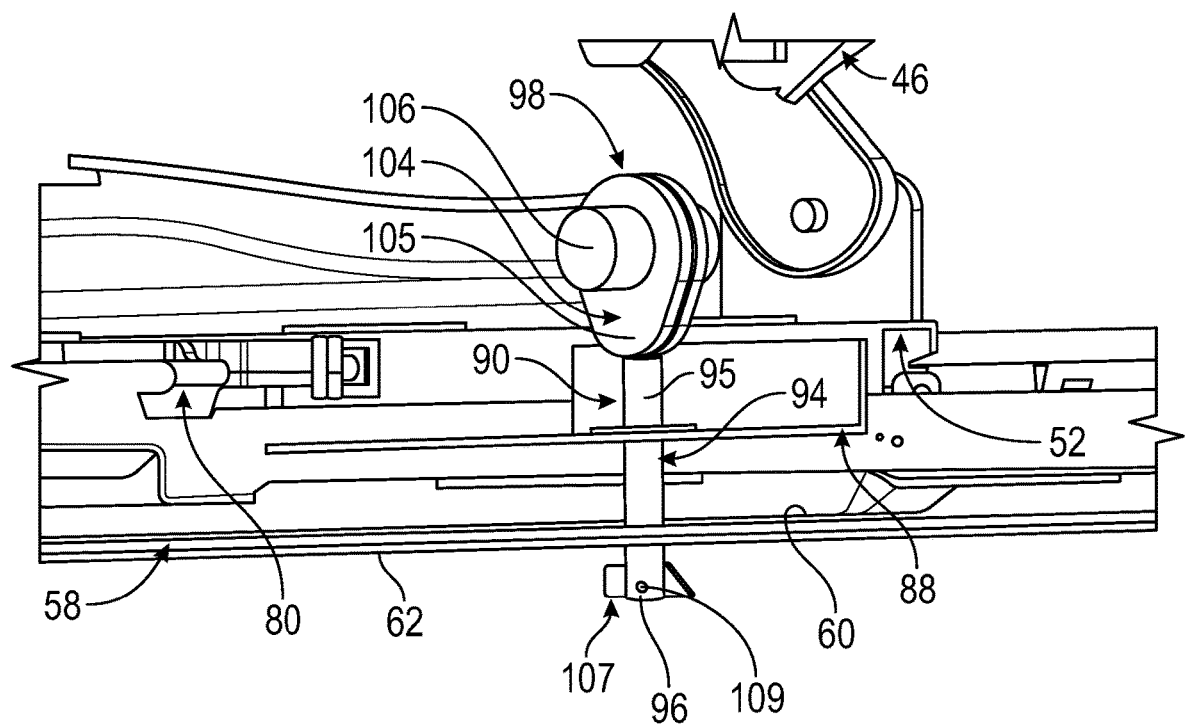
FIG. 4 is a plan view of a locking member of the MAGLAV seat system of FIG. 2 extending through the support surface, in accordance with a non-limiting example.

In a non-limiting example, reference will follow to FIG. 4 in describing first locking member 90 with an understanding that second locking member 92 includes similar structure. First locking member 90 takes the form of a retractable pin 94 that selectively extends through one of the plurality of openings 67 in floor 58 to lock seat base member 44 in a selected position. Retractable pin 94 includes a first end 95 and a second end 96. Second end 96 is opposite to first end 95 and extends through second cross-member 88 selectively entering into the one of the plurality of openings 67.

An actuator 98 is positioned at first end 95. Actuator 98 takes the form of a cam mechanism 104 having a lobe 105. Cam mechanism 104 is coupled to a motor 106. Motor 106 selectively rotates cam mechanism 104 causing lobe 105 to push retractable pin 94 toward support surface 58 and into one of the plurality of openings 67. Further rotation of cam mechanism 104 causes lobe 105 to disengage from first end 95 allowing retractable pin 94 to move upwardly away from support surface 58. In a non-limiting example, a selectively deployable locking portion 107 is pivotally connected to second end 96 through a pin 109. Selectively deployable locking portion 107 prevents unintentional withdrawal of retractable pin 94 from the one of the plurality of openings 67.

In accordance with a non-limiting example, a plurality of magnets, indicated generally at 116, FIG. 3, is mounted at second side 62 of support surface 58. As will be detailed herein, the plurality of magnets 116 take the form of selectively activated electro-magnets 118 which are selectively activated in order to repel first cross-member 80 and levitate seat system 23 from first and second seat rails 70 and 72. Once levitated, seat system 23 may move fore and/or aft as desired by a user. In a non-limiting example, a levitation controller 122 is coupled to the plurality of electro-magnets 118. Levitation controller 122 may also be connected to motor 106.

In a non-limiting example, levitation controller 122 includes a central processor unit (CPU) 126 operatively connected to a non-volatile memory 128 and a magnet actuator 130. While shown as being co-located, CPU 126, non-volatile memory 128, magnet actuator 130, and or motor actuator 132 may be integrated into other systems. Levitation controller 122 may also be connected to a motor actuator 132 that selectively deploys and/or retracts retractable pin 94. Levitation controller 122 may also control deployment of selectively deployable locking portion 107. That is, one or more of the plurality of electro-magnets 118 may be controlled to attract and/or repel selectively deployable locking portion 107.

In accordance with a non-limiting example, a user may manipulate a seat actuator 134 to facilitate fore-to-aft movement of seat system 23. Seat actuator 134 may signal motor actuator 132 to release first and second locking members 90 and 92 and activate magnet actuator 132 to activate one or more of the plurality of electro-magnets 118 to repel first cross-member 80 and raise first and second glides 52 and 54 from corresponding ones of first and second seat rails 70 and 72.

At this point, using his/her feet, the user may move seat system 23 to a selected location. CPU 126, relying on information stored in non-volatile memory 128 will position seat system 23 such that first and second locking members 90 and 92 align with select ones of the plurality of openings 67. At this point, motor actuator 132 may deploy first and second locking members 90 and 92 to secure seat system 23 in the selected position. In another non-limiting example, in addition to raising seat system 23, levitation controller 122 may also actuate the plurality of magnets 116 to create a fore and/or aft movement of seat base member 44. In this example, the user need not use his/her feet to adjust seat system 23.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle seat system comprising:
    a support surface having a first side and a second side that is opposite the first side;
    a first seat rail coupled to the first side of the support surface;
    a second seat rail coupled to the first side of the support surface spaced from the first seat rail;
    a seat member including a first stanchion moveably supported at the first seat rail, a second stanchion moveably supported at the second seat rail, and a member arranged between the first stanchion and the second stanchion, the member being formed from a magnetic material;
    a magnet mounted at the second side of the support surface; and
    a levitation controller operatively connected to the magnet, the levitation controller being selectively activated to drive the magnet to repel the member and raise the first stanchion and the second stanchion relative to corresponding ones of the first seat rail and the second seat rail.

2. The vehicle seat system according to claim 1, wherein the magnet includes a plurality of magnets arrayed about the second side of the support surface.

3. The vehicle seat system according to claim 2, wherein the levitation controller selectively controls one or more of the plurality of magnets to repel the member and raise the first stanchion and the second stanchion relative to the first seat rail and the second seat rail respectively.

4. The vehicle seat system according to claim 2, wherein the levitation controller selectively controls one or more of the plurality of magnets to shift the seat member relative to the first seat rail and the second seat rail.

5. The vehicle seat system according to claim 4, wherein the levitation controller selectively controls one or more of the plurality of magnets to establish one of a plurality of pre-determined seat positions for the seat member.

6. The vehicle seat system according to claim 5, wherein the support surface includes a plurality of locking elements.

7. The vehicle seat system according to claim 6, further comprising another member arranged between the first stanchion and the second stanchion, the another member supporting a locking member configured to engage one of the plurality of locking elements to secure the seat member in the one of the plurality of pre-determined seat positions.

8. The vehicle seat system according to claim 7, wherein the locking member comprises a selectively extendable pin and the plurality of locking elements comprise a plurality of openings formed in the support surface, the selectively extendable pin passing into the one of the plurality of openings to secure the seat member in the one of the plurality of pre-determined seat positions.

9. The vehicle seat system according to claim 8, wherein the selectively extendable pin includes a selectively deployable locking portion that selectively prevents withdrawal of the selectively extendable pin from the one of the plurality of openings.

10. The vehicle seat system according to claim 8, further comprising a cam mechanism that selectively shifts the selectively extendable pin into the one of the plurality of openings.

11. A vehicle comprising:
a body defining a passenger compartment; and
a vehicle seat system arranged in the passenger compartment, the vehicle seat system comprising:
a support surface having a first side and a second side that is opposite the first side;
a first seat rail coupled to the first side of the support surface;
a second seat rail coupled to the first side of the support surface spaced from the first seat rail;
a seat member including a first stanchion moveably supported at the first seat rail, a second stanchion moveably supported at the second seat rail, and a member arranged between the first stanchion and the second stanchion, the member being formed from a magnetic material;
a magnet mounted at the second side of the support surface; and
a levitation controller operatively connected to the magnet, the levitation controller being selectively activated to drive the magnet to repel the member and raise the first stanchion and the second stanchion relative to corresponding ones of the first seat rail and the second seat rail.

12. The vehicle according to claim 11, wherein the magnet includes a plurality of magnets arrayed about the second side of the support surface.

13. The vehicle according to claim 12, wherein the levitation controller selectively controls one or more of the plurality of magnets to repel the member and raise the first stanchion and the second stanchion relative to the first seat rail and the second seat rail respectively.

14. The vehicle according to claim 12, wherein the levitation controller selectively controls one or more of the plurality of magnets to shift the seat member relative to the first seat rail and the second seat rail.

15. The vehicle according to claim 14, wherein the levitation controller selectively controls one or more of the plurality of magnets to establish one of a plurality of pre-determined seat positions for the seat member.

16. The vehicle according to claim 15, wherein the support surface includes a plurality of locking elements.

17. The vehicle according to claim 16, further comprising another member extending between the first stanchion and the second stanchion, the another member supporting a locking member configured to engage one of the plurality of locking elements to secure the seat member in the one of the plurality of pre-determined seat positions.

18. The vehicle according to claim 17, wherein the locking member comprises a selectively extendable pin and the plurality of locking elements comprise a plurality of openings formed in the support surface, the selectively extendable pin passing into the one of the plurality of openings to secure the seat member in the one of the plurality of pre-determined seat positions.

19. The vehicle according to claim 18, wherein the selectively extendable pin includes a selectively deployable locking portion that selectively prevents withdrawal of the selectively extendable pin from the one of the plurality of openings.

20. The vehicle according to claim 18, further comprising a cam mechanism that selectively shifts the selectively extendable pin into the one of the plurality of openings.

* * * * *